(12) United States Patent
Wojak

(10) Patent No.: US 7,543,438 B2
(45) Date of Patent: Jun. 9, 2009

(54) GAS TURBINE TOPPING DEVICE IN A SYSTEM FOR MANUFACTURING SULFURIC ACID AND METHOD OF USING TURBINE TO RECOVER ENERGY IN MANUFACTURE OF SULFURIC ACID

(76) Inventor: Bogdan Wojak, 405-2233 Allison Road, Vancouver, BC (CA) V6T 1T7

( * ) Notice: Subject to any disclaimer, the term of this patent is extended or adjusted under 35 U.S.C. 154(b) by 0 days.

(21) Appl. No.: 12/237,470

(22) Filed: Sep. 25, 2008

(65) Prior Publication Data

US 2009/0077944 A1    Mar. 26, 2009

Related U.S. Application Data

(60) Provisional application No. 60/974,965, filed on Sep. 25, 2007.

(51) Int. Cl.
  *F02G 1/00*    (2006.01)
  *F02G 3/00*    (2006.01)
(52) U.S. Cl. ............ 60/39.182; 60/39.461; 60/783
(58) Field of Classification Search ............ 60/39.182, 60/776, 772, 39.463, 39.464, 39.465, 39.12
  See application file for complete search history.

(56) References Cited

U.S. PATENT DOCUMENTS

| 3,287,902 | A | * | 11/1966 | Khristianovich et al. ...... 60/780 |
| 4,099,374 | A | * | 7/1978 | Foster-Pegg ............... 60/39.12 |
| 4,199,327 | A | * | 4/1980 | Hempill et al. ............... 48/202 |
| 5,175,995 | A | * | 1/1993 | Pak et al. ................. 60/39.182 |
| 5,218,815 | A | * | 6/1993 | Korenberg .................... 60/775 |
| 5,626,638 | A | * | 5/1997 | Valkanas .................. 48/197 R |
| 6,155,039 | A |   | 12/2000 | Agee |

| 6,351,935 | B1 | * | 3/2002 | Bronicki et al. .......... 60/39.182 |

(Continued)

FOREIGN PATENT DOCUMENTS

EP    0753652    1/1997

(Continued)

OTHER PUBLICATIONS

Harman et al. Gas turbine topping for increased energy recovery in sulfuric acid manufacture, Applied Energy (3) 1997 Applied Science Publisher Ltd. England, 1997.

*Primary Examiner*—William H Rodriguez
(74) *Attorney, Agent, or Firm*—Sonnenschein Nath & Rosenthal LLP

(57) ABSTRACT

A gas turbine topping device, which is disposed upstream of a steam-raising section, is used for generating power in the manufacture of sulphuric acid. A sulfur-burning combustor generates hot sulfur dioxide while a pressure-exchanging ejector mixes the hot combustion gases with a cooler gas (e.g. pressurized air, pressurized $N_2$ or recycled sulfur dioxide ($SO_2$) to form a mixed working gas having a temperature below the maximum allowable temperature (metallurgical limit) of the blades of the turbine. The turbine drives an oxygen compressor which supplies oxygen to a bubbling chamber which also receives $S_8$ to produce sulfur vapor for combustion. By using stoichiometric quantities, sulfur dioxide is delivered in requisite quantities to a sulfuric acid plant without any harmful emissions. Useful amounts of electrical power can thus be generated by the gas turbine topping device as well as the downstream steam turbine by harnessing the enormous amount of waste heat involved in the manufacture of sulfuric acid.

20 Claims, 7 Drawing Sheets

U.S. PATENT DOCUMENTS 6,438,494 B1  8/2002  Yamamoto

FOREIGN PATENT DOCUMENTS

| JP | 60191007 | 9/1985 |
| JP | 60191008 | 9/1985 |
| JP | 60191009 | 9/1985 |
| JP | 60221306 | 11/1985 |
| JP | 60221307 | 11/1985 |

* cited by examiner

Mass and energy flows in conventional contact sulphuric acid plant.

Energy flow in the gas turbine modified sulphuric acid plant    PRIOR ART Harman Bubbling apparatus

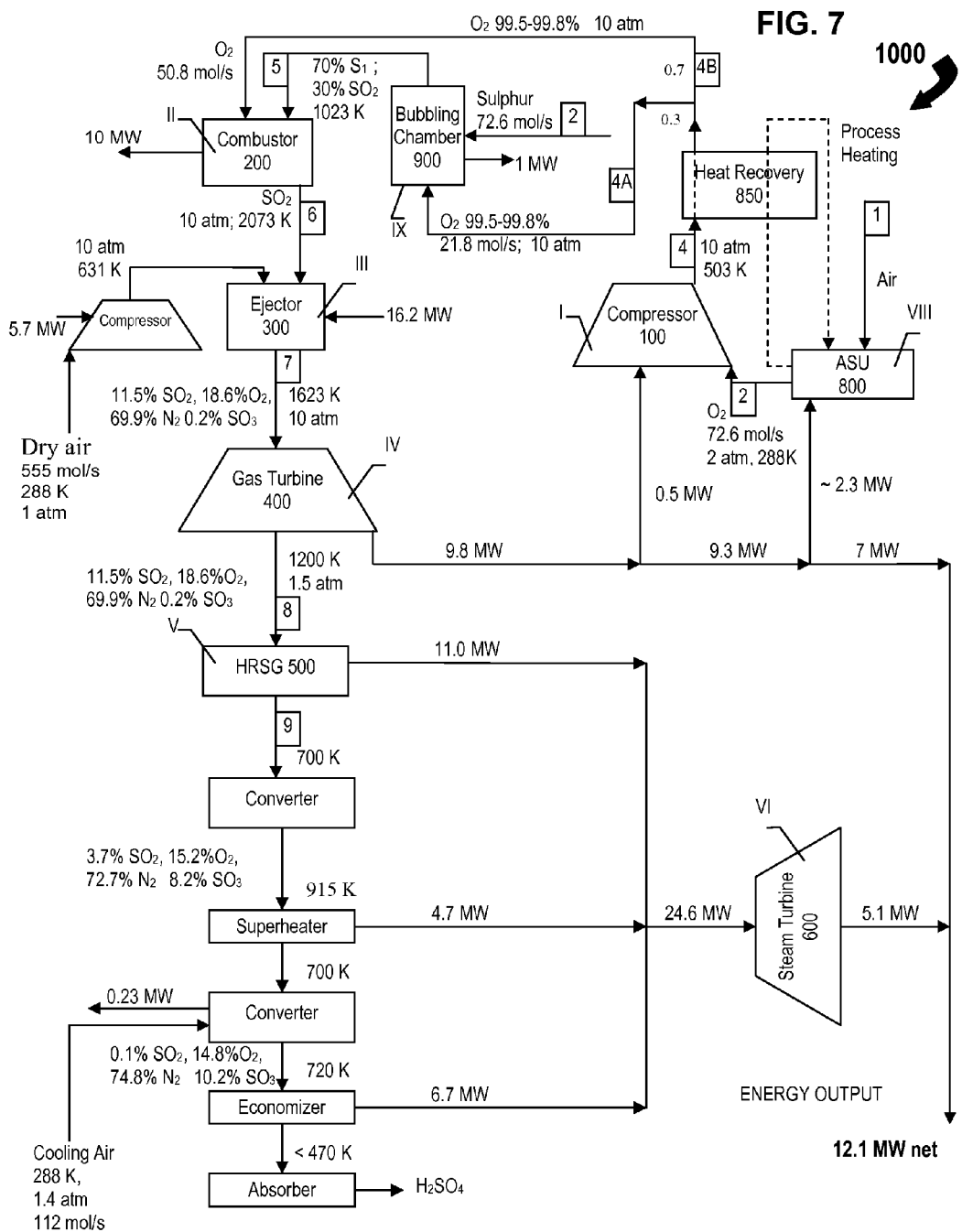
Energy flow in modified sulphuric acid plant (10 atm)

GAS TURBINE TOPPING DEVICE IN A SYSTEM FOR MANUFACTURING SULFURIC ACID AND METHOD OF USING TURBINE TO RECOVER ENERGY IN MANUFACTURE OF SULFURIC ACID

CROSS-REFERENCE TO RELATED APPLICATIONS

This application claims priority under 35 USC 119(e) from U.S. Provisional Patent Application 60/974,965 entitled "Utilization of Sulphur Species for Power Generation" filed on Sep. 25, 2007, the contents of which are hereby incorporated by reference in their entirety to the full extent permitted by law.

TECHNICAL FIELD

The present invention relates generally to a method for increasing energy recovery in sulfuric acid manufacture and, in particular, to a method of utilizing the heat produced by sulfur burning directly in a gas turbine expander as a "topping" device preceding a steam-raising system.

BACKGROUND

Sulfuric acid plants produce a prodigious amount of high-level waste heat but nearly all of the high-level waste heat is utilized in the production of electricity through a steam turbo/generator.

An alternative to generating power in steam turbines is to expand the hot combustion product gases directly to produce work in a turbine expander. From an exergetic viewpoint this is a more efficient way of utilizing the heat for power production.

Very few examples exist of an expansion turbine used for direct expansion of a reactor product gas for recovery of the reaction heat. In such a system, the turbine expander may impact significantly the downstream operations, disturb optimum process conditions or even require a change in the process configuration. The patent of Janssen et al. (EP 0753652) describes a process for the synthesis of ethane from methane. The exothermic reaction takes place over a catalyst in the combustion chamber of a gas turbine. The reaction products are expanded and the turbine drives the methane and combustion air compressor. The cycle is open with no recycling of reaction products. More recently Agee et al. (U.S. Pat. No. 6,155,039) patented a synthesis gas production system comprising a gas turbine with an autothermal reformer between the compressor and expander. The reformer uses a combination of partial oxidation and steam reforming. The exothermic heat of the partial step provides the heat for an endothermic steam-reforming reaction. The reformer produces synthesis gas and serves as the combustor for the gas turbine.

In relation to energy recovery in sulfuric acid manufacture, conceptual case studies on the subject have been published, namely a study on: turbine expander integration with a sulfuric acid plant by Harman et al. (*Gas turbine topping for increased energy recovery in sulfuric acid manufacture, Applied Energy* (3) (1977) Applied Science Publisher Ltd, England, 1977).

Harman's study revealed a potential significant advantage in the energy recovery and, for a typical case, the net energy recovery as electric power can be improved by 60-70 percent over that possible with simple steam-rising equipment. For the purpose of modeling a gas turbine plant, Harman chose as a basis a Rolls-Royce 'Tyne' engine which has an air flow closely matched to a 600 t/d acid plant. Although burning all the volume of sulfur required by the acid plant was prevented by the maximum temperature constraints (metallurgical limit) of the turbine, he stated that in the event of it being possible to operate a gas turbine at a turbine inlet temperature of around 1400-1500° C., it would become possible to use a turbine as the major energy extraction device for the production of power.

Whether or not this potential advantage can be realized depends on a number of factors including fuel feed and combustion chamber design. In contrast to other liquid fuels, sulfur does not have a light fraction and has a rather high boiling point (450° C.). It has a greater heat of evaporation, surface tension, ignition temperature, and specific gravity, but a lower heat of combustion than, for example fuel oil. Sulfur also loses out to fuel oil with regards to conditions for spraying because of the low-pressure drop across the spray jet due to its higher viscosity and surface tension.

At the sulfuric acid plants, liquid sulfur is burned in dry air in a large refractory-lined chamber before being passed through the waste heat boiler. An important role in sulfur combustion is played by the difference between the boiling point and the temperature at which it is supplied to the furnace. Liquid sulfur is usually sprayed into furnaces at the temperature of minimum viscosity (150° C.) in the form of fine droplets through a variety of nozzles, mainly using pressure atomization. The droplets vaporize at temperatures above the boiling point of sulfur by taking heat from the gases surrounding them and from radiation or convection. The use of greater preheating is held back by the fact that the maximum sulfur viscosity lies between 150 and 400° C., while at temperatures around 160° C. sulfur gets so viscous that it cannot flow, it is deposited on the walls of the sulfur heater, and hinders heat exchange. Thus, the only real source of heat for the initial zone in the process must be the zone of sulfur combustion, whose heat is transmitted by radiation or convection in the organized recirculation of hot combustion products. The flame temperature is, typically 750° C. to 1200° C. depending on the percentage of $SO_2$ required.

The sulfur vapor consists of all molecules from $S_2$ to $S_8$ in temperature- and pressure-dependent equilibria but only the $S_2$ molecules in the vapor phase are actually oxidized. Evaporation of liquid sulfur initially produces mainly $S_8$ molecules, this dissociation proceeds, however, very slowly, which means that sulfur enters the vapor phase also mainly in the form of $S_8$ molecules and the $S_8$ molecules are only decomposed to $S_2$ to any appreciable extent at temperatures above 600° C. More than 60% of the heat reaction (about 9,400 kJ/kg S) liberated in the combustion of sulfur to sulfur dioxide is theoretically required for preheating the air and sulfur and for evaporation and decomposition of the sulfur at 600° C.

Harman at al. in his study examined technical factors such as liquid sulfur feed and combustion chamber design and corrosion resistance of turbine materials to an atmosphere of sulfur dioxide, oxygen and nitrogen.

Harman's study concludes that the combustion system of a gas turbine engine appears capable of burning liquid sulfur, the major modification necessary being temperature control of the plumbing and spray nozzles. This obviates the possible need for a separate refractory-lined burner, fed by the engine compressor and exhausting to the turbine, which would be a potentially very hazardous pressure vessel and would add serious complication and expense to the gas turbine engine installation.

The equipment chosen by Hartman required to vaporize sulfur by the plumbing at high temperature (930 K in case of "Tyne") which would be needed to maintain it as a vapor at a required pressure (12 atm), means of temperature control by steam jacketing. The sulfur may not be able to ignite from cold and a reasonable starting procedure will be also required. Additional, the nozzles would need to be preheated for the sulfur flow and the exhaust gases generate by preheating by hydrocarbon fuel should be ducted to atmosphere until just before the sulfur combustion is started. The hydrocarbon and sulfur fuels should not be mixed but may well use the existing separate pilot and main nozzle plumbing and orifices, respectively.

The dual fuel capability of the engine would require two high quality control systems to supply the fuels correctly. The engine would need its supply of kerosene at all times to operate the compressor bleed control unless a satisfactory alternative system was provided as an aid to starting. The plant air ducting would need to include an engine bypass and sufficient valving to permit a safe start-up procedure. The existing air blowers would be bypassed when the engine is on line, with a corresponding saving of power. An additional control room may be required.

In addition to Herman's conceptual study, a series of patents by Moichi. JP Pat. No., 60191007, 60191008, 60191009, 60221306, and 60221307 discloses various arrangements of combined pressurized and ordinary-pressure sulfur furnaces but by doing so Moichi added serious vulnerability, complication and expense to the gas turbine engine installation.

Although the prior art proposes some basic techniques for energy recovery in the context of sulfuric acid production, improvements to these prior-art technologies remain highly desirable.

SUMMARY OF THE INVENTION

Embodiments of the present invention provide an improved method for employing a gas turbine expander as the major energy extraction device for the recovery of energy from the combustion of sulfur with dry air and/or oxygen, as a gas turbine topping device preceding a steam-raising system at a sulfuric acid plant.

The methods are readily compatible not only with sulfuric acid plant operation, but also with sulfur load follow operational requirements, and are easily controllable during plant startup and shutdown operations.

As set forth in this disclosure, it has been advantageously recognized by Applicant that for the generation of sulfur vapor, substantial amounts of sulphur can be vaporized when an oxygen-containing gas is injected beneath the surface of a pool of molten sulfur maintained above its auto-ignition temperature. The sulfur is evaporated by the heat of the sulfur oxidation reaction; however, because the "flame" is submerged in liquid sulfur, the evaporation of the liquid sulfur limits the temperature of the surrounding liquid to its boiling point. The evaporation process is easily controlled by regulating the flow of oxygen-containing gas and without oxygen-containing gas flow everything stops. Therefore, safety interlocks are straight forward and also control of the oxygen-containing gas.

The concentration of oxygen in the oxygen containing gas can be as high as 100 percent by volume. Bubbling oxygen through molten sulfur at a temperature at which the sulfur boils ensures maximum evaporation that can be 1.5-3 times more exhaustive compared with previously known methods.

During this improved process, the gas bubbles do not come into direct contact with the elements of the apparatus, and the walls of the reaction chamber are not heated above the temperature of the melt; furthermore, the temperature of the medium at the bubbling stage does not exceed 700-800° C., which thereby makes it possible to use common (non-refractory) construction materials; thus, it allows pressurizing the bubbling apparatus without any serious vulnerability as would be associated with pressurizing of a refractory-lined sulfur burner.

According to embodiments of the present invention, the sulfur is preferably evaporated by bubbling oxygen-containing gas through molten sulfur under a pressure of from 1 to 35 atmospheres.

The subsequent combustion of the vaporized sulfur increases the oxidation process by 2-3 times compared with previously known methods because, even under the most favorable conditions of heat exchange (absence of separation, heat exchange within the volume), the time required to prepare the sulfur for ignition takes up more than 70 percent of the total process of its combustion.

According to embodiments of the present invention, the oxidation of sulfur vapor is preferably performed under a pressure of 1 to 35 atmospheres.

Carrying out the stage of sulfur evaporation and/or the stage of sulfur vapor oxidation under pressure, either successively or concurrently, makes it possible to convert the high energy of the combustion gases to mechanical energy through the turbine expander.

This invention provides also a method for full utilization of the full capability of existing gas turbine expanders through incorporation of pressure-exchange devices, where cooling of the sulphur combustion gases at temperatures above the tolerance of available gas turbines is accomplished by compressing another gas in an ejector. The ejector, as opposed to the turbines, can operate at very high temperatures because of its inherently simple construction which results in very low mechanical stress and high reliability.

Accordingly, one main aspect of the present invention is a method of generating power in a process of manufacturing sulphuric acid. The method entails vaporizing sulphur, combusting sulphur vapor with oxygen to generate hot combustion gases, and mixing the hot combustion gases in an ejector with a cooling gas that has a temperature substantially lower than a temperature of the hot combustion gases to thereby produce a mixed working gas for driving a gas turbine to generate power, the mixed working gas having a temperature less than a maximum allowable temperature determined by a metallurgical limit of turbine blades in the gas turbine.

Another main aspect of the present invention is a system for generating power in the manufacture of sulphuric acid. The system includes a bubbling chamber for vaporizing sulphur, a combustor for combusting sulphur vapor with oxygen to produce hot combustion gases to drive a gas turbine for generating power, and a heat-exchanging and pressure-exchanging ejector disposed upstream of the gas turbine for cooling the hot combustion gases by mixing the hot combustion gases with a cooling gas supplied into the ejector to thereby create a mixed working gas having a temperature less than a maximum allowable temperature determined by the metallurgical limit of the turbine blades of the gas turbine.

Another main aspect of the present invention is a system for generating electric power in a gas turbine topping device preceding a steam turbine disposed upstream of a sulphuric acid plant configured to receive sulphur dioxide for manufacturing of sulphuric acid. The system has means for vaporizing sulphur to generate sulphur vapor, means for combusting the sulphur vapor, and means for receiving hot combustion gases from the means for combusting the sulphur vapor and for mixing the hot combustion gases with a cooling gas that has a temperature substantially lower than a temperature of the hot combustion gases to thereby produce a mixed working gas for driving the gas turbine topping device to generate electric power, the mixed working gas having a temperature less than a maximum allowable temperature determined by a metallurgical limit of turbine blades of the gas turbine topping device.

In various embodiments of the present invention, the ejector is supplied with a cooling gas such as, for example, pressurized air, pressurized nitrogen, recycled sulphur dioxide in order to lower the temperature of the combustion gases to a below the metallurgical limit of the turbine blades so that a gas turbine topping device can be used to increase the recovery of energy from the process of manufacturing sulphuric acid. Radically more energy can be harnessed using this novel technology as compared with the prior-art systems and methods.

BRIEF DESCRIPTION OF THE DRAWINGS

The present invention is described with reference to the following drawings, in which:

FIG. 7 is a process flowchart depicting mass and energy flows for the modified sulfuric acid plant in accordance with one embodiment of the present invention.

DETAILED DESCRIPTION OF THE PRESENTLY PREFERRED EMBODIMENTS

Figure 3:
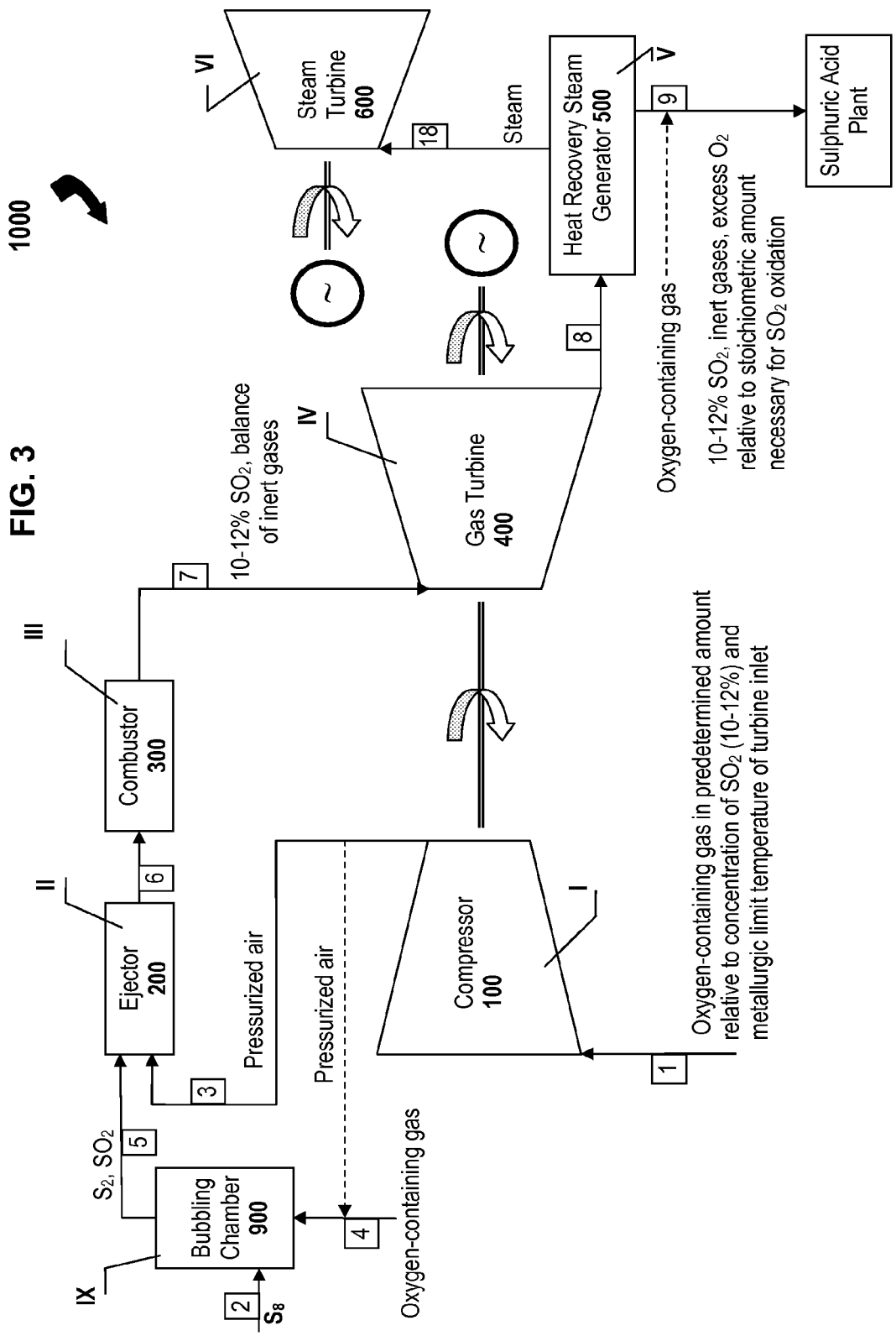
FIG. 3 is a simplified schematic depiction of a bubbling apparatus.

Referring to FIG. 3, there is shown a simplified example of a system 1000 adapted for combusting an adequate volume of sulfur in an oxygen-containing gas such as dry air or enriched-air in relation to a required production volume of sulfuric acid in a sulfuric acid plant and for subsequently expending all (or substantially all) of the product of the combustion reactions, in a gas turbine configured as a "topping" device that precedes a steam-raising system to thereby recover energy from the sulfur combustion, in accordance with one aspect of the present invention. The combined cycle system 1000 comprises seven main stages (I, II, III, IV, V, VI, and IX) each having at least one unit to assist in the process of burning sulfur in dry air to produce sulfur dioxide and generate electric power. As is illustrated in the first main embodiment of the present invention, the Brayton-cycle of the system 1000 comprises a compressor 100 at stage I, an ejector 200 at stage II, a combustor 300 at stage III (ejector and combustor preferably are combined in one device but are shown separately for illustration), and a gas turbine 400 at stage IV, which is mechanically coupled to, and thus drives, the gas compressor 100 and electric generator. The Rankine-cycle of the system 1000 comprises a heat-recovery steam generator (HRSG) 500 at stage V, and a steam turbine/generator 600 at stage VI. The system 1000 also comprises sulfur-submerged combustion furnace 900 at stage IX (also referred to herein as a "bubbling chamber", "sulfur vaporizer", or "sulfur evaporator", whose function will be described in greater detail below).

Referring to the drawings FIGS. 3, 4, 5, 6, and 7 the sulfur dioxide laden with sulfur vapor is formed when an oxygen-containing gas such as air, oxygen or any desired combination of both is fed into the bubbling chamber 900 through a line 4 and is injected beneath the surface of a pool of molten sulfur maintained above its auto-ignition temperature. However, because the "flame" is submerged in liquid sulfur, the sulfur is evaporated by the heat of the sulfur oxidation reaction and the evaporation of the liquid sulfur limits the temperature of the surrounding liquid to its boiling points. Maintaining the temperature at which the sulfur boils ensures maximum evaporation, and if technical or pure oxygen is used as a bubbling gas the evaporation can be 1.5-3 times more exhaustive compared with previously known methods. The composition of the vapor-gas mixture, as it effluents from the bubbling chamber, is determined by the process parameters, such as pressure, temperature, and heat loss. The composition of the mixture can be regulated by withdrawing part of the heat using heat exchangers located in the bubbling bed.

When sulfur is burned in air, oxygen is the reactant in excess. The resulting vapor stream contains nitrogen, sulfur vapor, sulfur dioxide, and some sulfur trioxide. When oxygen is used, sulfur is always in excess, and all the oxygen is consumed as it reacts with sulfur to form sulfur dioxide laden with sulfur vapor.

The concentration of oxygen in the bubbling gas can be as high as 100 percent by volume. The evaporation process is easily controlled by regulating the flow of oxygen-containing gas, and thus without its flow everything stops. Therefore, safety interlocks are straight forward and also control the oxygen-containing gas.

In the method described, the heat of the reaction in the bubbling zone of the furnace is consumed to evaporate sulphur, and to heat the melt to the working temperature. During the process, the gas bubbles do not come into direct contact with the elements of the apparatus, and the walls of the reaction chamber are not heated above the temperature of the melt; furthermore, the temperature of the medium at the bubbling stage does not exceed 700-800° C. which thereby makes it possible to use common (non-refractory) construction materials. Accordingly, it allows pressurizing the bubbling apparatus without any serious vulnerability as normally associated with pressurizing a refractory-lined sulfur burner.

According to embodiments of the invention, the sulfur is preferably evaporated by bubbling oxygen-containing gas through molten sulfur under a pressure of from 1 to 35 atmospheres.

The method described above (submerged combustion) was first commercially employed for the sulfur dioxide generation by the Brown & Root Braun's sulfur process called "No Tie In Claus Expansion" (NoTICE). In this process the sulfur vaporized into sulfur dioxide containing gas is removed by condensation and recycled back to the sulfur evaporator. By using a combination of sulfur dioxide and oxygen instead of air in the Claus reaction furnace, this process doubles the capacity of refinery sulfur recovery units. Temperature in the reaction furnace is controlled by maintaining a constant ratio of oxygen/sulfur dioxide. In fact, the flow of oxygen to the reaction furnace is controlled by sensing the flow of sulfur dioxide. If there is no sulfur dioxide flow, there can be no oxygen flow. This guarantees safe operation. The second process that commercially employs this method of liquid sulfur dioxide production is the Calabrian Zero Emission process. This technology has the same basis as the NoTICE process but is more economical because it relies on the submerged combustion of sulfur with air.

The subsequent combustion of the vaporized sulfur increases the oxidation process by 2-3 times compared with previously known methods because, even under the most favorable conditions of heat exchange (absence of separation, heat exchange within the volume), the time required to prepare the sulfur for ignition takes up more than 70 percent of the total process of its combustion.

According to embodiments of the invention, the oxidation of sulfur vapor is preferably performed under a pressure of 1 to 35 atmospheres.

Figure 4:
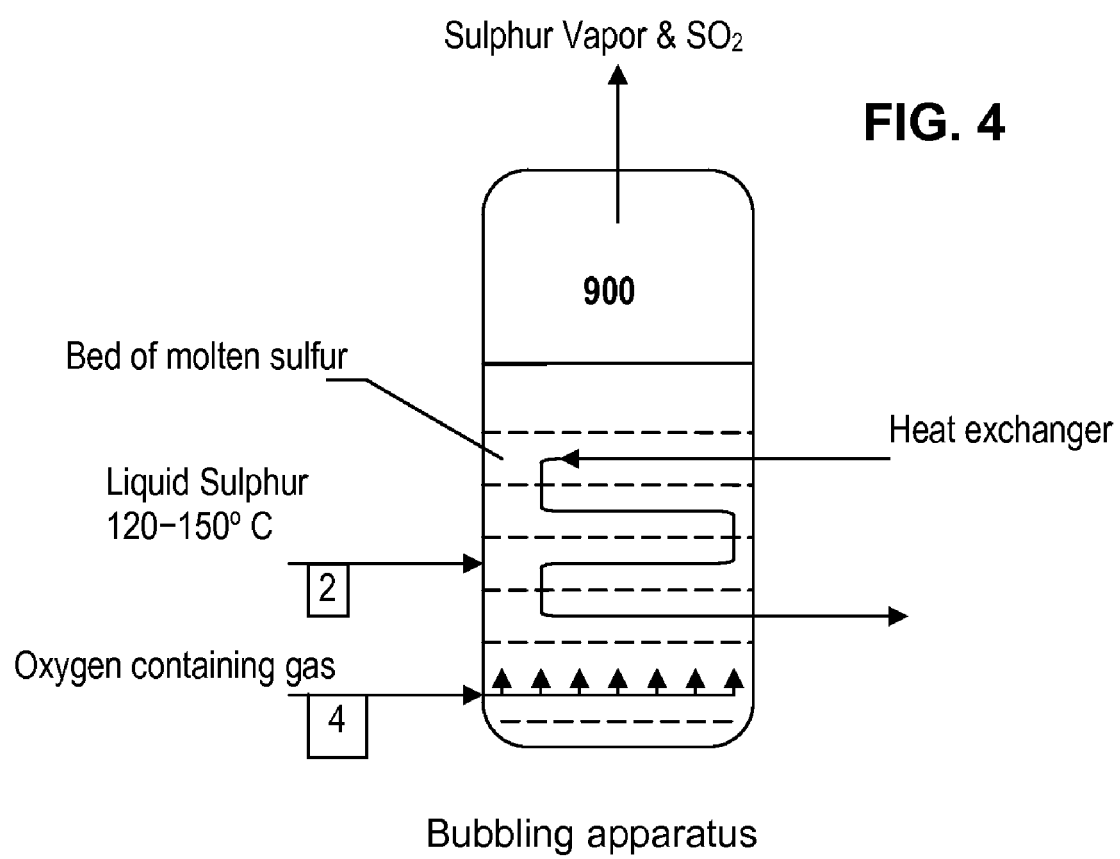
FIG. 4 is a schematic depiction of a system in which the oxidizing agent is dry air in accordance with an embodiment of the present invention.

Referring to FIG. 4, the sulfur dioxide laden with sulfur vapor is formed when unpressurized air is fed into the bubbling chamber 900 through a line 4 and is injected beneath the surface of a pool of molten sulfur maintained above its autoignition temperature. The resulting vapor stream, which contains nitrogen, sulfur vapor, sulfur dioxide, and some sulfur trioxide, is then conveyed through a line 5 to a pressure-exchange device such as ejector 200 at stage II, and then by a line 6 to a combustor 300 at stage III for the subsequent oxidation of the sulfur vapor by oxygen in the dry air pressurized by compressor 100 at stage I. The oxidation of sulfur vapor is preferably performed under a pressure of 2 to 35 atmospheres.

The dry air is delivered into the ejector 200 at stage II through a line 3 and afterward to a combustor in a predetermined quantity primarily relative to the maximum allowable inlet temperature of the turbine expander (the nitrogen entering with the air absorbs part of the heat of combustion and becomes part of the working medium to be expended in the gas turbine) and to a quantity required for complete oxidation of sulfur vapor. The quantity of the air may also correspond to the requisite concentration of $SO_2$ (e.g. 10-12%), and correspond to a stoichiometric ratio as calculated for the summary reaction of sulfur oxidation to sulfur trioxide.

Afterward, the turbine outlet gases are directed through a line 8 to an HRSG (heat recovery steam generator) 500 at stage V, for producing steam to drive a steam turbine/generator and then the gases through a line 9 are directed to the sulfuric plant.

There are some disadvantages of using air as an oxygen-containing gas mostly because of the necessity of using a large excess of air under pressure which, in turn, creates a large parasitic load on the system, because compression of the air requires mechanical energy and thus reduces the net power produced from the system, as well as reducing the overall efficiency of the system. Also, elimination of nitrogen from oxygen-containing gas increases the amount of sulfur vaporized into the sulfur dioxide containing gas.

On the other hand, when gaseous sulfur is burned with oxygen under stoichiometric conditions, the resulting temperature exceeds the metallurgical limits of the turbine. Because of the chain character of the burning process, sulfur vapor burns in oxygen in tenths of a second and attains a level close to the theoretical temperature of adiabatic burning of sulfur in oxygen (about 3000-3500° C.). As a result, it is also necessary to utilize a large excess of cooling gas.

From the view point of the second law of thermodynamics, the straight cooling of combustion gases from the combustion temperature to a temperature that is acceptable for turbine operation, as practiced in conventional systems, destroys completely the energy contained between these two temperatures. However, according to this invention, the same cooling is accomplished with concomitant production of useful work.

By using a pressure-exchange device such as an ejector, the hot gases generated in the combustor at temperatures above the tolerance of available gas turbines are used to compress another gas in the ejector. The hot gases are thereby cooled to a level acceptable for use in present-day turbines by a flow-induction process which produces compression work on another gas.

The ejector, as opposed to the turbines, can operate at very high temperatures because of its inherently simple and robust construction which results in very low mechanical stress and high reliability. However, the nature and physical conditions of the driving (primary) and entrained (secondary) fluids determine the overall conventional steady-flow ejector performance which, in general, is much poorer than that of mechanical compressors such as centrifugal or axial types. One of the main reasons for the modest efficiency of conventional steady-flow ejector-powered processes is the comparatively large mass flow ratio between the entrained and entraining fluids. The efficiency of the energy transfer can be significantly increased with the higher molecular weight ratio. Therefore, prior art conceptual applications proposed working fluids that included helium as the secondary fluid and sodium or liquid metal as the primary fluid. This was difficult to implement, however.

In an ejector, momentum can be imparted from the primary fluid to the secondary fluid by two mechanisms: the shear stresses at the tangential interfaces between the primary and secondary fluids as a result of turbulence and viscosity; and, the work of interface pressure forces acting across normal interfaces separating the primary and secondary fluids. The latter mechanism is called pressure exchange. Pressure exchange is available only in a non-steady flow field. Utilizing the reversible work of pressure forces acting at fluid interfaces between primary flow and secondary flow, a pressure exchange ejector has the potential for much greater momentum transfer efficiency than that of a conventional ejector that relies on dissipative turbulent mixing.

Garris in U.S. Pat. No. 6,434,943 disclosed a novel pressure-exchange compressor-expander, whereby a higher-energy primary fluid compresses a lower-energy secondary fluid through direct fluid-fluid momentum exchange. The pressure-exchange compressor-expander utilizes non-steady flow principles and supersonic flow principles to obtain an ejector-compressor which can attain high adiabatic efficiencies while having a simple design, small size, low weight, and which is simple and inexpensive to manufacture.

Moreover, when the oxygen is produced through an elevated-pressure air separation unit (EP ASU) it produces in parallel nitrogen which can act as a thermal diluent, reducing the temperature of the combustion products. The nitrogen is already compressed and does not impose a large parasitic load on the system; as a result, the net power produced from the system is increased, as well as increasing the overall efficiency of the system.

Figure 5:
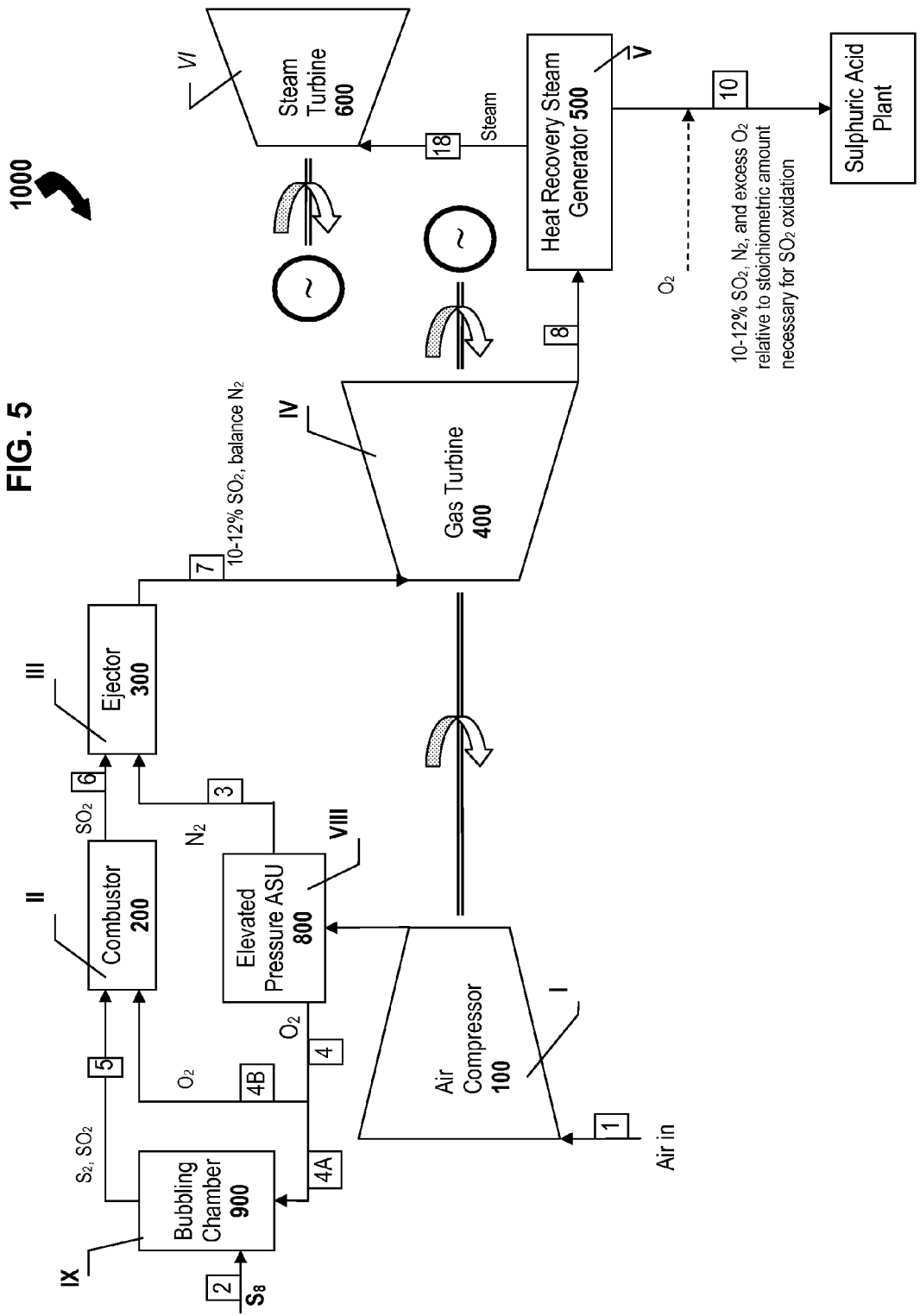
FIG. 5 is a schematic depiction of a system in which the oxidizing agent is oxygen in accordance with another embodiment of the present invention.

Referring to the drawings FIG. 5 depicts a simplified example of the system 1000 adapted for combusting sulfur in oxygen for subsequently expending all (or substantially all) of the product of the combustion reactions, in a gas turbine configured as a "topping" device that precedes a steam-raising system to thereby recover energy from the sulfur combustion, in accordance with one aspect of the present invention. The combined cycle system 1000 comprises eight main stages (I, II, III, IV, V, VI, VII, and IX) each having at least one unit to assist in the process of burning sulfur to produce sulfur dioxide and generate electric power. As is illustrated in the second embodiment of the present invention, the Brayton-cycle of the system 1000 comprises a compressor 100 at stage I, a combustor 200 at stage II, an ejector 300 at stage III, and a gas turbine/generator 400 at stage IV, which is mechanically coupled to, and thus drives, the air compressor 100. The Rankine-cycle of the system 1000 comprises a heat-recovery steam generator (HRSG) 500 at stage V, and a steam turbine/generator 600 at stage VI. The system 1000 also comprises an oxygen source 800 at stage VII (also referred to herein as an "air separation unit", and a sulfur-submerged combustion furnace 900 at stage IX.

In this embodiment, the sulfur dioxide gas laden with sulphur vapor is obtained by bubbling oxygen through the bed of molten sulfur in the submerged-combustion furnace 900 at stage IX, and oxidizing the sulfur vapor by oxygen in a stoichiometric quantity (and optionally in an excess required for $SO_2$ oxidization) in the combustor 200 at stage II.

According to embodiments of the invention, the submerged combustion of sulfur is preferably performed under a pressure of 1 to 35 atmospheres.

Because, in this embodiment, the temperature of the combustion gases (mainly $SO_2$) that are generated during combustion of the sulfur vapor in the combustor 200 at stage II exceeds the metallurgical limits of the turbine, predetermined amounts of a cooling gas such as pressurized nitrogen supplied by the EP ASU are delivered to the ejector 300 at stage III through conduit 3. The predetermined quantity of nitrogen is set primarily relative to the maximum allowable inlet temperature of the turbine expander (the nitrogen entering with the air absorbs part of the heat of combustion and becomes part of the working medium to be expended in the gas turbine) and to the quantity corresponding to the requisite concentration of $SO_2$ (e.g. 10-12%).

The pressure-exchange ejector 300 at stage III transfers the heat energy to the cooler nitrogen thus producing a working medium at an operating temperature of the gas turbine 400 at stage IV. In other words, mixing the dry air with the hot $SO_2$ ensures that the temperature of the resulting mixture (the mixed working gas) is below the maximum allowable temperature (metallurgical limit) of the turbine blades of the gas turbine 400. As a corollary benefit, all of the requisite sulfur (i.e. a stoichiometric amount) can be burned in the combustor 200, thus obviating the need to burn any residual sulfur in the downstream exhaust of the gas turbine 400.

Figure 6:
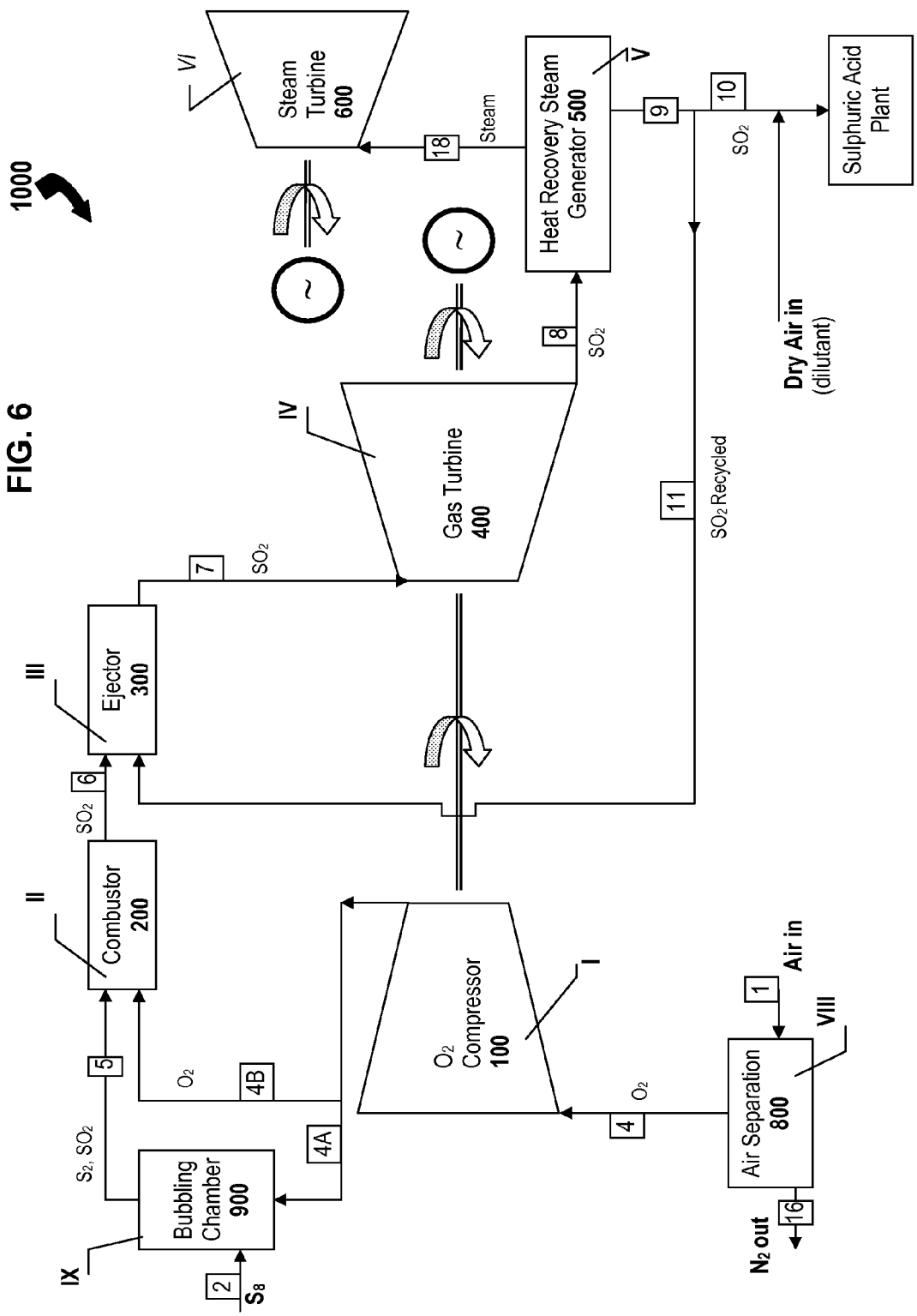
FIG. 6 is a schematic depiction of a system in which oxidizing agent is oxygen and the cooling gas is recycled $SO_2$ in accordance with another embodiment of the present invention.

As illustrated in FIG. 6, in an another embodiment of the present invention, the Brayton-cycle of the system 1000 comprises a compressor 100 at stage I, a combustor 200 at stage II, an ejector 300 at stage III, and a gas turbine 400 at stage IV which is mechanically coupled to, and thus drives, the oxygen compressor 100. The Rankine-cycle of the system 1000 comprises a heat-recovery steam generator (HRSG) 500 at stage V, and a steam turbine 600 at stage VI. The system 1000 also comprises an oxygen source 800 at stage VII (also known as the air separation unit), and a sulfur-submerged combustion furnace 900 at stage IX (also known as the bubbling chamber) for vaporizing sulphur to produce sulphur vapor.

In this embodiment, to minimize heat damage to the components at stage IV (e.g. the turbine blades), a predetermined amount of recycled sulfur dioxide (i.e. the recycled part of working fluid 7) is mixed with the hot combustion gases (primarily $SO_2$) from the combustor 200 to cool the hot $SO_2$ so that the resulting temperature of the mixture of hot and cool $SO_2$ (the "mixed working gas") is less than the metallurgic limit of the turbine blades of stage IV. Recycling of sulfur dioxide gas in a semi-closed system therefore overcomes the challenge of handling excessive combustion temperatures. The use of an ejector 300 at stage III transfers the energy produced during combustion to the working fluid mixture at a much lower temperature. The $SO_2$ return is delivered to ejector 300 through conduit 11. Carrying out the stage IX of submerged sulfur combustion under pressure makes it possible to utilize the energy of the gas for circulation of the gas mixture in the system.

An energy flow for a modified sulfuric acid plant is now presented below merely for the purposes of illustration. The reader should not look to the precise values (temperatures, pressures, etc.) that are referenced in each of these examples as, in any way, limiting the scope of the invention, which is defined solely by the appended set of claims.

Figure 1:
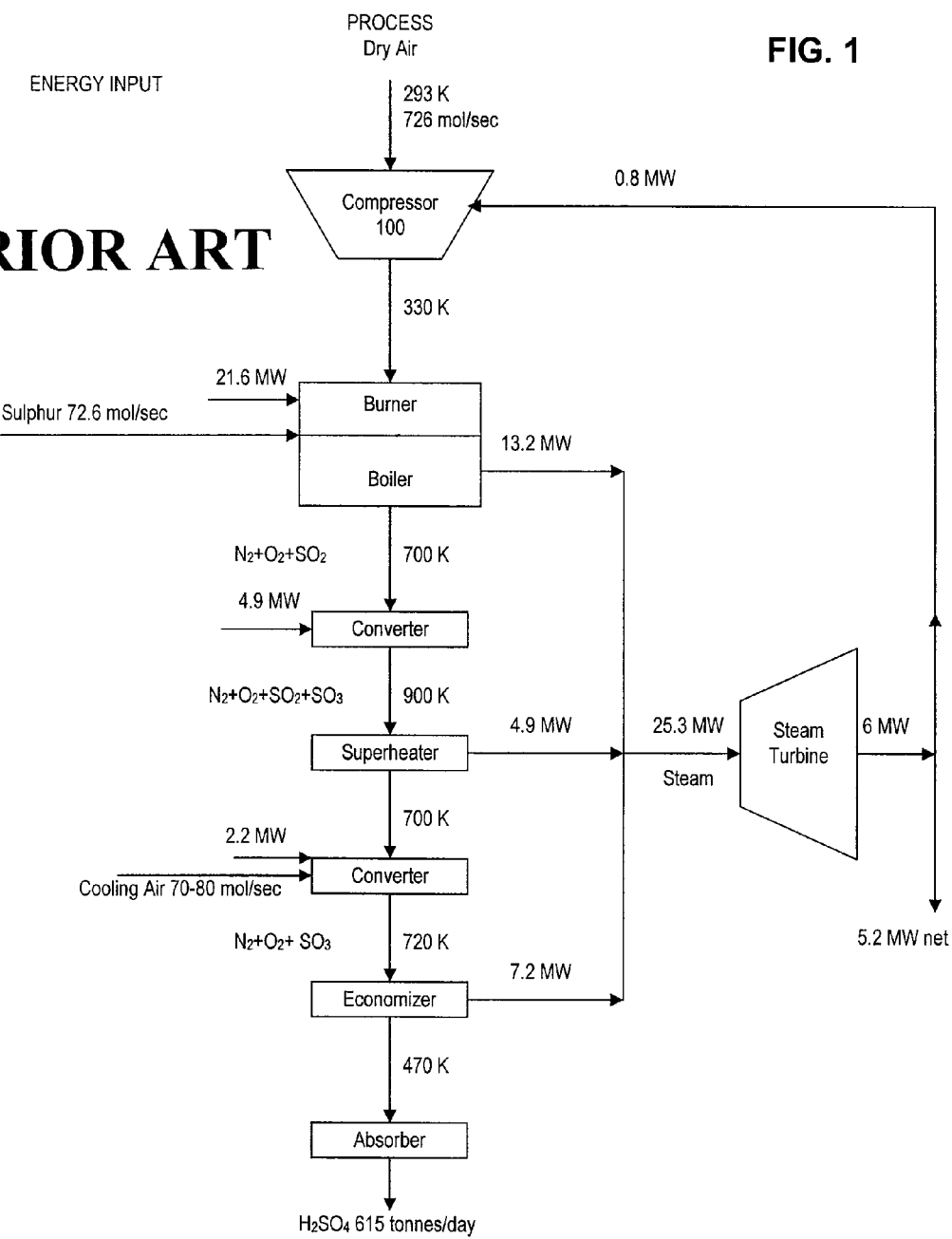
FIG. 1 is a process flowchart depicting mass and energy flows in a conventional contact sulfuric acid plant.
Figure 2:
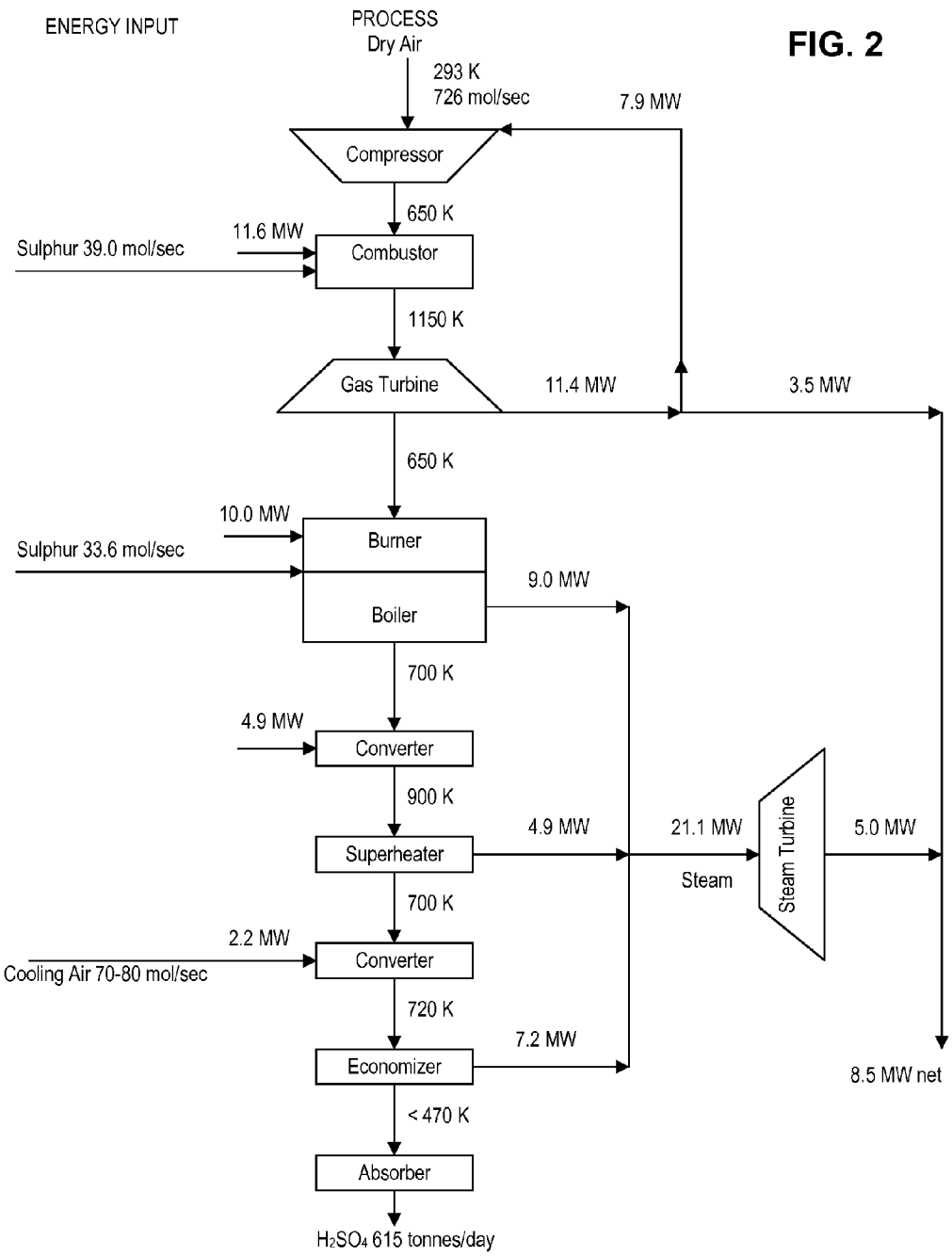
FIG. 2 is a process flowchart depicting mass and energy flows according to Harman's modified process.

FIG. 7 is a process flowchart depicting mass and energy flows for the modified sulfuric acid plant in accordance with embodiments of the present invention, in particular the system 1000 presented above. FIG. 7 shows, by way of example, typical temperature and pressure values as well as the gaseous composition at various steps in the process. The mass and energy balance shown in FIG. 7 is based on Harman's production of 615 tonnes per day sulfuric acid, chosen for illustrative comparison (see FIG. 2).

In the scenario presented in FIG. 7, it can be assumed that the net electrical output of the system 1000 shown is approximately 12 megawatts (MW) for this particular sulfuric acid plant. The steam turbine 400 was simulated to have an overall conversion efficiency of 23.7%, the same as that reported by Harman and Williamson (see Applied Energy (3), 24-40, 1977).

From the foregoing disclosure, it should be apparent that this novel system 1000 can be used to generate electric power in a gas turbine topping device (e.g. gas turbine 400) preceding a steam raising section (e.g. heat recovery steam generator 500) and a steam turbine (e.g. steam turbine 600). The steam turbine 600 is disposed upstream of a sulphuric acid plant that is configured to receive sulphur dioxide (e.g. via line 9) for manufacturing of sulphuric acid. The system 1000 comprises means for vaporizing sulphur (e.g. bubbling chamber 900) to generate sulphur vapor (e.g. $S_2$ with $SO_2$), means for combusting (e.g. combustor 200) the sulphur vapor, and means (e.g. ejector 300) for receiving hot combustion gases from the means for combusting the sulphur vapor and for mixing the hot combustion gases (i.e. the gases exhausted from the combustor) with a cooling gas (e.g. air, pressurized air, nitrogen gas or recycled sulphur dioxide) that has a temperature substantially lower than a temperature of the hot combustion gases to thereby produce a mixed working gas for driving the gas turbine topping device to generate electric power (or do other useful work). This mixing can be accomplished in a heat-exchanging and pressure-exchanging ejector. The resulting mixed working gas exiting the ejector thereby has a temperature less than a maximum allowable temperature determined by a metallurgical limit of turbine blades of the gas turbine topping device (e.g. gas turbine 400).

The present invention has been described in terms of specific embodiments, implementations and configurations which are intended to be exemplary and illustrative only. Many obvious variations, refinements, and improvements can be made by persons of ordinary skill in the art in light of the foregoing disclosure. These variations, refinements and improvements are thus intended to fall within the scope of the present invention for which an exclusive right is hereby sought. The scope of the exclusive right sought is therefore intended to be limited solely by the appended claims.

What is claimed is:

1. A method of generating power in a process of manufacturing sulphuric acid, the method comprising:
   vaporizing sulphur;
   combusting sulphur vapor with oxygen to generate hot combustion gases; and mixing the hot combustion gases in an ejector with a cooling gas that has a temperature substantially lower than a temperature of the hot combustion gases to thereby produce a mixed working gas for driving a gas turbine to generate power, the mixed working gas having a temperature less than a maximum allowable temperature determined by a metallurgical limit of turbine blades in the gas turbine.

2. The method as claimed in claim 1, wherein the mixing of the hot combustion gases with the cooling gas occurs in a heat-exchanging and pressure-exchanging ejector that is supplied with pressurized air as the cooling gas.

3. The method as claimed in claim 1, wherein the mixing of the hot combustion gases with the cooling gas occurs in a heat-exchanging and pressure-exchanging ejector that is supplied by an elevated-pressure air-separation unit (EP ASU) with pressurized nitrogen gas ($N_2$) as the cooling gas.

4. The method as claimed in claim 1, wherein the mixing of the hot combustion gases with the cooling gas occurs in a heat-exchanging and pressure-exchanging ejector that is supplied with sulphur dioxide gas ($SO_2$) recycled from downstream of the gas turbine.

5. The method as claimed in claim 1 wherein the vaporizing of sulphur comprises:
   supplying liquid sulphur ($S_8$) into a bubbling chamber to form a pool of molten sulphur;
   maintaining the pool of molten sulphur above its auto-ignition temperature; and
   feeding oxygen beneath a surface of the pool of molten sulphur to thereby vaporize the sulphur.

6. The method as claimed in claim 1, further comprising:
   directing outlet gases comprising sulphur dioxide from the gas turbine to a heat recovery steam generator;
   generating steam using the heat recovery steam generator; and
   generating electric power using the steam to drive a steam turbine.

7. The method as claimed in claim 1, further comprising delivering sulfur dioxide from the heat recovery steam generator to a sulfuric acid plant for manufacturing sulfuric acid.

8. The method as claimed in claim 1, wherein the combusting of sulphur vapor is performed under a pressure of 1 to 35 atmospheres.

9. The method as claimed in claim 1, wherein the vaporizing of sulphur is performed under a pressure of 1 to 35 atmospheres.

10. The method as claimed in claim 1, further comprising:
   compressing an oxygen-containing gas using the gas turbine to create a pressurized oxygen-containing gas; and
   using the pressurized oxygen-containing gas for both the vaporizing of sulphur and the combusting of the sulphur vapor.

11. A system for generating power in the manufacture of sulphuric acid, the system comprising:
   a bubbling chamber for vaporizing sulphur;
   a combustor for combusting sulphur vapor with oxygen to produce hot combustion gases to drive a gas turbine for generating power; and
   a heat-exchanging and pressure-exchanging ejector disposed upstream of the gas turbine for cooling the hot combustion gases by mixing the hot combustion gases with a cooling gas supplied into the ejector to thereby create a mixed working gas having a temperature less than a maximum allowable temperature determined by the metallurgical limit of the turbine blades of the gas turbine.

12. The system as claimed in claim 11, further comprising a compressor mechanically driven by the gas turbine, the compressor compressing an oxygen-containing gas and supplying a portion of said oxygen-containing gas to the bubbling chamber.

13. The system as claimed in claim 12, wherein the compressor is also connected to the ejector for supplying another portion of the pressurized oxygen-containing gas to the ejector as a cooling gas.

14. The system as claimed in claim 12, further comprising an elevated-pressure air-separation unit for receiving pressurized air from the compressor and for separating the pressurized air into pressurized oxygen gas and pressurized nitrogen gas, the elevated-pressure air-separation unit being connected to the bubbling chamber and combustor for supplying the pressurized oxygen gas to the bubbling chamber and combustor, the elevated-pressure air-separation unit also being connected to the ejector for supplying pressurized nitrogen gas as the cooling gas to the ejector.

15. The system as claimed in claim 12, further comprising an air-separation unit disposed upstream of the compressor for receiving ambient air, for separating the air into oxygen and nitrogen gases, and for supplying the oxygen gas to the compressor while exhausting nitrogen gas to the atmosphere.

16. The system as claimed in claim 15, wherein the cooling gas is recycled sulphur dioxide that is taken from a point downstream of the gas turbine.

17. The system as claimed in claim 11, further comprising:
   a heat recovery steam generator disposed downstream of the gas turbine for generating steam; and
   a steam generator driven by the steam from the steam generator to generate power.

18. A system for generating electric power in a gas turbine topping device preceding a steam turbine disposed upstream of a sulphuric acid plant configured to receive sulphur dioxide for manufacturing of sulphuric acid, the system comprising:
   means for vaporizing sulphur to generate sulphur vapor;
   means for combusting the sulphur vapor; and
   means for receiving hot combustion gases from the means for combusting the sulphur vapor and for mixing the hot combustion gases with a cooling gas that has a temperature substantially lower than a temperature of the hot combustion gases to thereby produce a mixed working gas for driving the gas turbine topping device to generate electric power, the mixed working gas having a temperature less than a maximum allowable temperature determined by a metallurgical limit of turbine blades of the gas turbine topping device.

19. The system as claimed in claim 18, wherein the means for receiving and mixing the hot combustion gases with the cooling gas comprises a heat-exchanging and pressure-exchanging ejector that is connected to a compressor for compressing an oxygen-containing gas, the compressor being mechanically driven by the gas turbine topping device.

20. The system as claimed in claim 19, wherein the compressor is connected to the means for vaporizing sulphur for supplying a pressurized oxygen-containing gas to the means for vaporizing sulphur.

* * * * *